Figure 1:
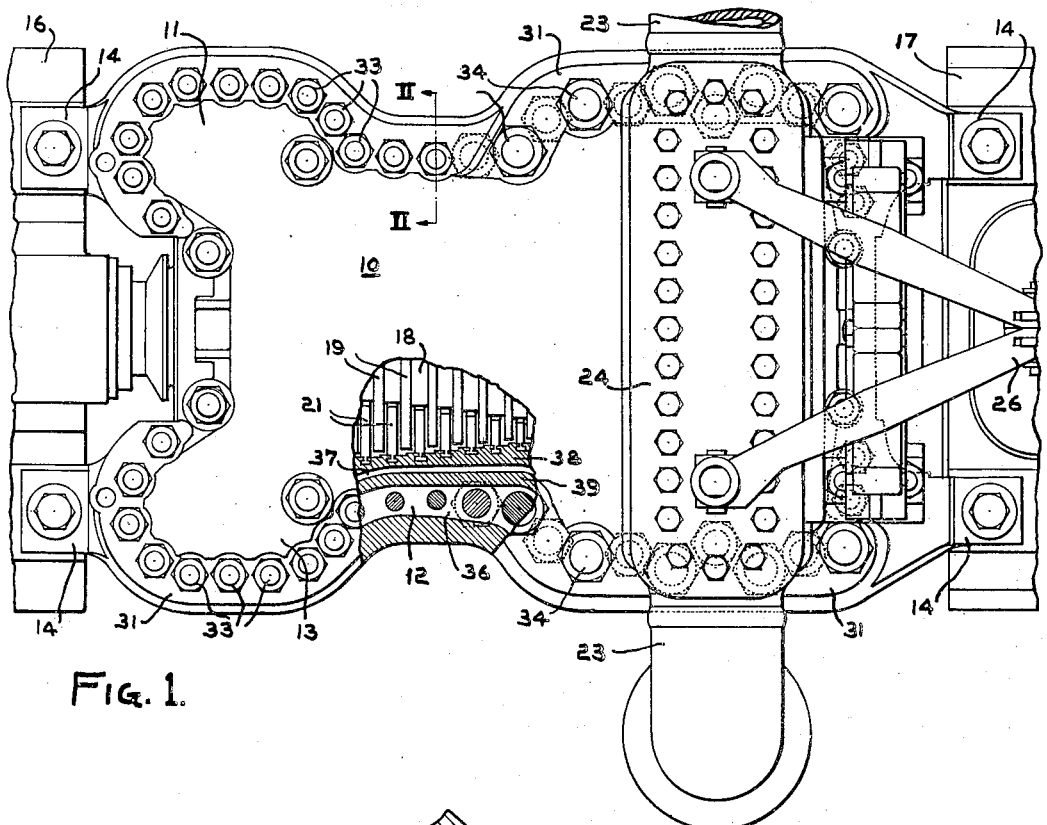

Nov. 28, 1939.　　　H. F. SCHMIDT　　　2,181,744

TURBINE CASING JOINT

Filed Aug. 2, 1938

WITNESSES:
Ralph T. French
James F. Mosser

INVENTOR
HENRY F. SCHMIDT.
BY
A. B. Rowis
ATTORNEY

Patented Nov. 28, 1939

2,181,744

UNITED STATES PATENT OFFICE 2,181,744

TURBINE CASING JOINT

Henry F. Schmidt, Lansdowne, Pa., assignor to Westinghouse Electric & Manufacturing Company, East Pittsburgh, Pa., a corporation of Pennsylvania Application August 2, 1938, Serial No. 222,573

2 Claims. (Cl. 285—130)

This invention relates to joints for casings subject to high pressures and temperatures, and more particularly to joints of heavily flanged casings for elastic fluid turbines operating under the above-mentioned conditions, and it has for an object to maintain a tight joint of this type.

With turbines operating at high pressures and temperatures it has been found necessary to provide the casing with heavy bolted joint flanges to withstand the pressures tending to cause leakage. However, it is difficult to keep the flange faces sufficiently tight across the entire joint to prevent leakage, such difficulties being due primarily to two causes: temperature differences in inner and outer regions of the flanges and adjacent walls, and slight unevennesses normally present in the surfaces forming the joints.

With relatively heavy walls and flanges the temperature of the inner regions of the walls is much higher than that of the outer regions thereof or of the flanges, this temperature difference resulting in uneven expansion or warping of the surfaces forming the joint.

Also, with thick walls providing meeting surfaces forming the joint, sufficient compression of the walls cannot be obtained to compensate for the unevennesses normally present in the meeting surfaces.

In accordance with the present invention, leakage at the joints, due to the above causes, is minimized by the provision of relatively high and narrow walls having meeting top surfaces forming an inner portion of the joint, the walls being materially compressed by stresses in the conventional flange bolts to compensate for slight unevennesses in the meeting surfaces and distortions of the casing structure. Such high and narrow walls may be formed by providing deep slots or grooves in the usual meeting surfaces forming the casing joints. The walls, being narrow, attain substantially uniform temperature throughout, thereby avoiding distortion due to temperature differences. Furthermore, being high and narrow, they can be compressed sufficiently to compensate for unevennesses in the meeting surfaces thereof. It is, therefore, a further object of the invention to provide a high pressure casing construction having these improved features.

Another object of the invention is the provision of slots in the walls of a high-pressure casing, adjacent the joints thereof, to prevent distortion of the surfaces forming the joints, and attendant leakage.

Figure 2:
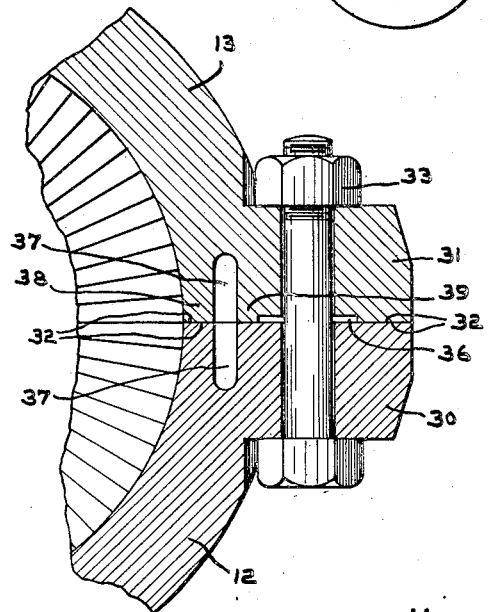

These and other objects are effected by my invention as will be apparent from the following description and claims taken in connection with the accompanying drawing, forming a part of this application, in which:

Fig. 1 is a plan view of a high-pressure turbine embodying the features of my invention, a portion of the turbine casing being broken away; and Fig. 2 is an enlarged fragmentary sectional view taken on the line II—II of Fig. 1, looking in the direction of the arrows.

In the drawing there is shown, at 10, a high-pressure elastic fluid turbine having a casing 11 comprised by a base 12 and a cover 13. The casing 11 is provided with horizontally projecting end lugs 14 bolted, or otherwise secured, to pedestals 16 and 17.

The casing houses a rotor 18 having spaced rows 19 of radially projecting blades cooperating with similar spaced rows of blades 21 fixedly secured to the casing. Motive fluid, such as steam, is supplied to the casing through the conduits 23, communicating with a steam chest 24, the flow of steam from the chest to the interior of the casing being controlled by the governing apparatus 26.

The casing base 12 and cover 13 have meeting surfaces 32 constituting a joint lying in the horizontal plane passing through the axial centerline of the turbine. The base and cover are provided with external flanges 30 and 31, respectively, the adjacent faces of which constitute continuations of the meeting surfaces 32 of the base and cover. These flanges are provided with bolts 33 and 34 extending therethrough for joining the base and cover, in a well-known manner. Preferably, either or both of the flanges 30 and 31 are provided with leakoff grooves 36.

Relatively deep slots or grooves 37 are formed in the meeting surfaces 32 to provide relatively high and narrow walls 38 and 39. Preferably, these walls have meeting surfaces, at 32, of a combined area approximating the total cross sectional areas of the bolts 33, and are of a sufficient length so as to be materially compressed by the stresses in the tightened bolts, thus compensating for any slight unevennesses of the meeting surfaces and distortions of the casing structure due to pressure or temperature differences.

While I have shown my invention in but one form, it will be obvious to those skilled in the art that it is not so limited, but is susceptible of various changes and modifications without departing from the spirit thereof, and I desire, therefore, that only such limitations shall be placed thereupon as are imposed by the prior art or as are specifically set forth in the appended claims.

What I claim is:

1. In a casing for high temperature fluids comprising a multiplicity of parts connected by joints, each joint including contacting portions of said parts and flanges integral therewith and extending outwardly therefrom, said contacting portions and the flanges having joint contact faces and bolts for connecting the flanges; means for securing and maintaining joint fluid-tightness including a relatively thin wall forming a part of a contacting portion and separated from the remainder thereof by a relatively deep groove, said thin wall having its contact face forming a part of a joint contact face and undergoing compression, when the requisite bolt tension is exerted, to compensate for any unevenness of the joint contact faces and serving to avoid upsetting the sealing relation of its face due to distortion.

2. In a casing for high temperature fluids comprising a multiplicity of parts connected by joints, each joint including contacting portions of said parts and flanges integral therewith and extending outwardly therefrom, said contacting portions and the flanges having joint contact faces and bolts for connecting the flanges; means for securing and maintaining joint fluid-tightness including opposed relatively thin walls forming parts of opposed contacting portions and separated from the remainder thereof by relatively deep grooves, said thin walls having their contact faces forming parts of a joint contact face and undergoing compression, when the requisite bolt tension is exerted, to compensate for any unevenness of the joint contact faces and serving to avoid upsetting the sealing relation of their faces due to distortion.

HENRY F. SCHMIDT.